United States Patent [19]

Raymond

[11] Patent Number: 4,703,613
[45] Date of Patent: Nov. 3, 1987

[54] MOWING AND TRIMMING APPARATUS

[75] Inventor: Richard O. Raymond, Ferrisburg, Vt.

[73] Assignee: Country Home Products, Inc., Ferrisburg, Vt.

[21] Appl. No.: 808,474

[22] Filed: Dec. 13, 1985

[51] Int. Cl.⁴ .................................. A01D 35/264
[52] U.S. Cl. ................................ 56/12.7; 56/16.7
[58] Field of Search ............... 56/12.7, 13.7, 16.7, 56/16.9, 17.1, 17.5, 255

[56] References Cited

U.S. PATENT DOCUMENTS

| | | | |
|---|---|---|---|
| 2,669,826 | 2/1954 | Watrous | 56/13.4 |
| 4,077,191 | 3/1978 | Pittinger, Sr. et al. | 56/12.7 |
| 4,189,901 | 2/1980 | Poetzger | 56/12.7 |
| 4,232,505 | 11/1980 | Walto | 56/12.7 |
| 4,378,668 | 4/1983 | Gullett | 56/12.7 |
| 4,442,659 | 4/1984 | Enbusk | 56/12.7 |
| 4,452,033 | 6/1984 | Scramuzza | 56/12.7 |
| 4,607,431 | 8/1986 | Gay | 56/12.7 |
| 4,625,501 | 12/1986 | Baba | 56/12.7 |

Primary Examiner—Stephen J. Novosad
Assistant Examiner—William P. Neuder
Attorney, Agent, or Firm—Fay, Sharpe, Beall, Fagan, Minnich & McKee

[57] ABSTRACT

A two wheeled mowing and trimming apparatus is disclosed. A rotating cutting head, positioned out in front of the wheels, can be positioned adjacent to either of the wheels while at the same time being tilted. Control of the cutting head's position is maintained through the use of a handle which allows the operator to tilt the frame. In response to the tilting of the frame the wheels are turned and the apparatus can then be positioned to travel in a direction parallel with a fence or building. With the wheels turned, the vegetation existing along the outside edge of the wheel closest to the structure can be trimmed. Also the cutting head is angled downwardly as a result of the tilting of the frame so that the vegetation can be cut close to the ground.

26 Claims, 7 Drawing Figures

MOWING AND TRIMMING APPARATUS

BACKGROUND OF THE INVENTION

1. Field of the Invention

This invention relates to a combined lawn mowing and lawn trimming machine of the type that is mounted on a frame and supported on two wheels.

2. Description of the Prior Art

The trend in lawn maintenance has always been to use a lawn mower to cut the lawn and a lawn trimmer to trim the edges of the lawn, including areas of vegetation that boarder fences and buildings. Recently, hand held line trimmers have become popular for performing the trimming operations. But, except for the small lawn, hand held trimmers are impractical for some people to use since they are too heavy to carry around for extended periods of time. Even with use on a small lawn, the difficulty of controlling hand held trimmers is experienced. The lack of control problem results in unevenly cut vegetation and scalping of the ground at the roots of the vegetation. Also, the lack of control problem is often compounded by user fatigue associated with carrying around the hand held trimmer.

Quite recently, a trend has developed toward making the hand held trimmer more suitable to the user and more compatible with the user's needs. Such efforts have included designing wheeled carriages and dollies to be used with the trimmers. But, while these devices have done much to alleviate user fatigue, they have done little to aid the user in controlling and positioning the rotating cutting head. For example, H. J. Enbusk in U.S. Pat. No. 4,442,659 discloses a dolly for a line trimmer that must be held in one hand while the trimmer, which is pivotally mounted to the dolly, is held in the other hand. With this device, each hand performs a separate positioning function resulting in an awkward combination for controlling the cutting head. Also, these types of devices do not confront the problem of having to use two separate machines for maintaining the lawn.

Prior art devices that combine mowing and trimming features in one machine are known. Such an apparatus is disclosed by Watrous in U.S. Pat. No. 2,669,826, wherein a two wheel lawn mower is disclosed having a forwardly mounted cutting head that is supported on a ground engaging shoe. In Watrous the axle and housing are pivotally connected, thereby permitting the entire cutting head to swing from side to side with respect to the rear wheels and handle. The plane of cutting remains parallel to the ground in each position of the cutting head. This limits the versatility of the machine, since the angle of the cutting plane cannot be changed.

In U.S. Pat. No. 4,077,191 to Pittinger, a filament-trimmer/mower is disclosed that includes a four wheel supported frame. Each of the front and rear wheel-and-axle assemblies are pivotally mounted with respect to the frame. Pittinger, however, suffers from the disadvantage that the rotating head is held in a fixed position between the wheels. Therefore, it is difficult to trim the vegetation growing along side a building or other structure, since the filament line would not normally extend outside the path of travel of the wheels.

SUMMARY OF THE INVENTION

The present invention overcomes the aforementioned disadvantages of the prior art by providing a two wheeled mower and trimmer that allows an operator to mow the lawn in the usual manner with the cutting plane of the cutting head parallel to the ground and trim the surrounding areas in an improved manner with the cutting plane non-parallel to the ground and with the cutting head shifted laterally or swung closer to one of the wheels.

It is an object of this invention to provide a mowing and trimming apparatus. In one position the cutting head is positioned parallel to the ground and positioned equidistantly between the wheels. In this position, the apparatus can be used as a mower. Also, in this position the apparatus can be used as a trimmer or the frame and cutting head can be moved with respect to the wheels and the cutting head shifted to a plurality of other trimming positions.

It is an object of this invention to allow an operator to trim a strip of vegetation growing against a building, fence or other structure at an angle downwardly by shifting the cutting head toward one side or the other while simultaneously changing the cutting plane angle so that the flexible cutting elements or blades extend outside the path of travel of the wheels and cut the vegetation at a downward angle.

It is an object of this invention to allow an operator to change from a mowing position to any of a plurality of trimming positions by merely tilting the frame through the use of one handle, to thereby reposition the cutting head with respect to the axle and wheels and reposition the cutting plane with respect to the ground.

It is an object of this invention to provide an axle and wheel assembly for a mowing and trimming apparatus that is pivoted to the frame in a manner that allows the wheels to turn under the frame while simultaneously allowing the frame to tilt relative to the wheels in response to the tilting of a single handle attached to the frame.

In an embodiment constructed according to the present invention, an axle having two wheels is pivotally mounted to a frame at an angle such that the pivot axis is oblique relative to the ground, when the apparatus is in the normal operating position. As a result of the angled pivot axis, the front of the frame swings from side to side as the frame is tilted about the frames longitudinal axis. In order to facilitate the relative movement between the frame and the wheels, the axle extends through slots provided in the sidewalls of the frame. These slots extend longitudinally in a direction perpendicular to the pivot axis of the axle. As the frame is tilted by applying a torque through the handle, the wheel and axle assembly is caused to turn under the frame.

The degree to which the frame tilts is dependent upon the angle of the pivot axis and correspondingly perpendicular longitudinal direction of the slots. The length of the slots affects the distance which the front of the frame will swing from side to side. Lengthening these slots increases the lateral shift distance, while shortening the slots decreases the distance. Only one handle is needed for an operator to push the apparatus, guide it through standard lawn mower maneuvers, and position the apparatus in a plurality of trimming positions in which the cutting plane is tilted and the cutting head is swung or shifted. Further the tilting and shifting movement is achieved simultaneously as a result of the torque applied to the frame, about the frame's longitudinal axis, through the handle.

In a preferred embodiment, the apparatus includes facing corrugated washers interposed between the axle and frame on the pivot axis. The washers, each fixed to one of the frame and the axle, are urged together by the force of a spring. In order, then, to pivot the axle relative to the frame, a torque of sufficient magnitude is needed to be applied to overcome the force of the spring acting on the facing washers. For each corrugation in the washers a stable relative position is maintained between the frame and the axle. Mowing is usually performed in the position in which the cutting plane is parallel to the ground and the cutting head is spaced equidistantly between the wheels. Trimming can also be conducted in this position, but many additional trimming positions, which are relatively stably maintainable, are made available to the operator.

DETAILED DESCRIPTION OF THE DRAWINGS

Figure 1:
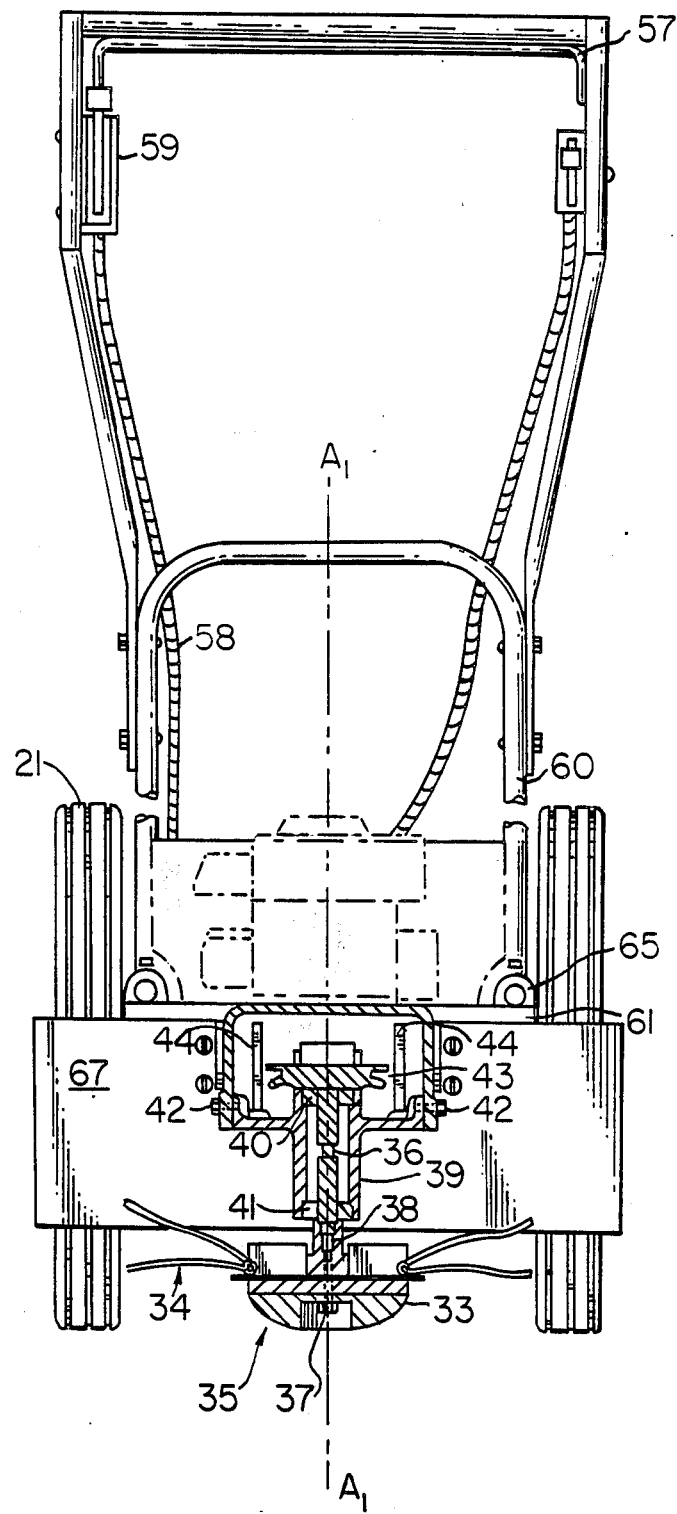
FIG. 1 is a front view of the apparatus with a section view of the power take-off shaft and cutting head assembly.
Figure 2:
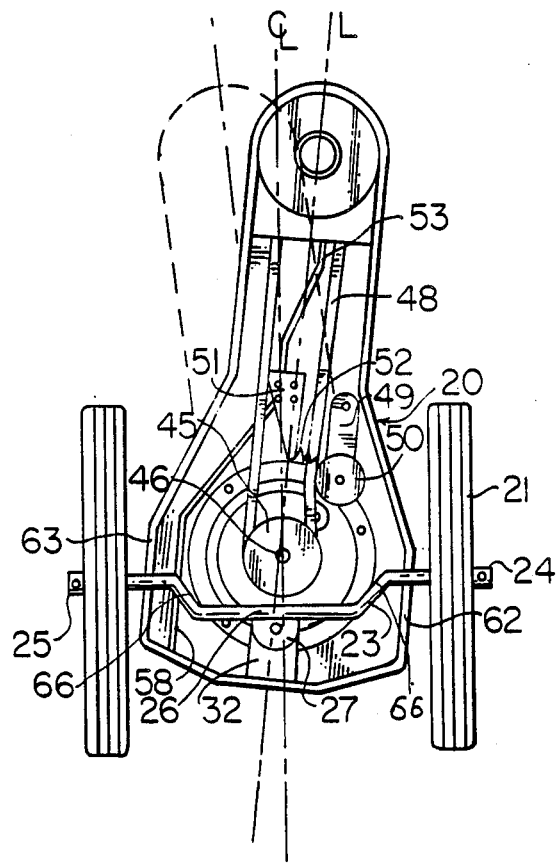
FIG. 2 is a bottom view of the apparatus in a trimming position.

With reference to FIGS. 1 and 2, a frame 20 is provided which is supported by ground engaging wheels 21 and 22 interconnected by an axle 23. Suitable collars 24 and 25 are provided to retain the wheels on the axle in a known manner. The wheels are provided with bearings of any conventional type, not shown, which allow the wheels to freely rotate about the axle.

The axle includes a mid-portion 26 which is pivotally mounted to the frame. In a first embodiment disclosed in FIGS. 2, 4, and 5, the axle is securely fastened, as by welding, to a washer 27. The washer is allowed to freely rotate about a bolt 28. A nut 29 is threaded onto bolt 28, but not so tight as to prevent washer 27 from turning. The washer can include a collar extension 30, as seen in FIG. 5, to which the axle can be further welded for additional support.

Figure 4:
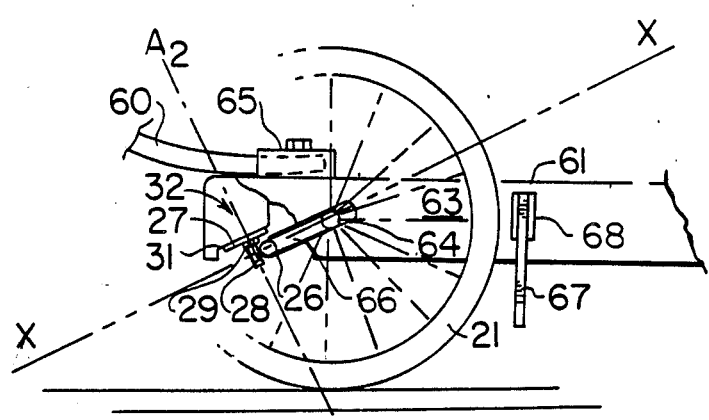
FIG. 4 is a partial right side view of the apparatus with the engine omitted, including a broken out section view showing an axle mount constructed according to a first embodiment.
Figure 5:
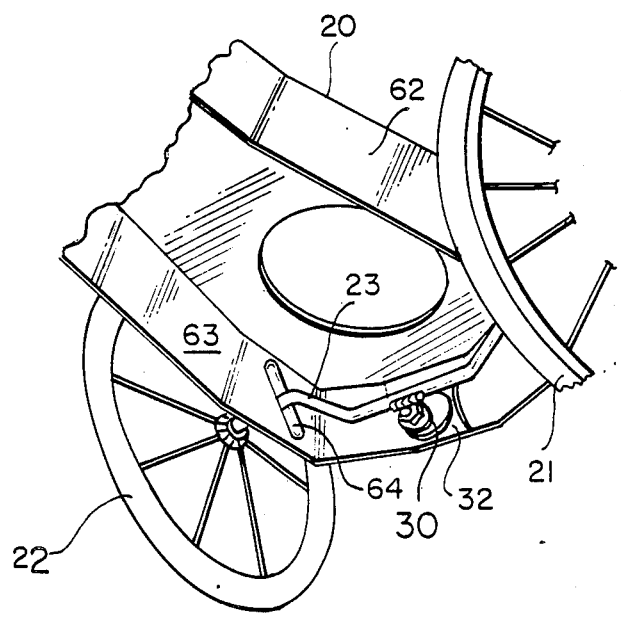
FIG. 5 is a partial bottom perspective view of the apparatus with the engine omitted.

As can be seen in FIG. 4, bolt 28 provides an axis of rotation, $A_2$ about which axle 23 pivots. Bolt 28 is suitably secured in the end plate 31 of an axle supporting portion 32 of frame 20. For example, bolt 28, could be a stud bolt, wherein end plate 31 would be provided with a threaded bore into which bolt 28 would be threadedly received. As an alternative construction, a bolt may have the head welded to end plate 31 or may be turned around so that it is threadedly received in a bore in the end plate so that a nut is not needed.

As shown in FIG. 1, in partial section, a cutting head 33 is provided which rotates about an axis $A_1$. Suitably secured to the cutting head are flexible cutting elements, such as nylon filaments 34. The particular way in which the filaments are attached to the cutting head do not constitute a part of this invention. As an alternative to fixed length cords, a suitable automatic cord feeding head or a plurality of cutting blades could be used. The cutting head includes a ground engaging bumper 35 having rounded edges as best seen in FIG. 1. To rotate the cutting head, a power take-off shaft 36 is provided to which the cutting head is drivingly connected. For connecting the cutting head to the power take-off shaft, a bolt 37 can be provided to be threadedly received in a blind bore 38 provided in the end face of shaft 36.

A bearing housing 39 is provided to support bearings 40 and 41 in a conventional manner, such as by a press-fit. The bearing housing is secured to frame 20 by bolts 42. Bearings 41 and 42 allow for free rotation of shaft 36. Keyed to shaft 36, or as an integral part thereof, is a pulley 43. Pulley 43 has a "V" groove and is adapted to receive a V-belt type of endless flexible transmission belt. Belt guides 44 are provided adjacent the sides of the pulley.

As seen in FIG. 2, a pulley 45 is provided that is fixed to the drive shaft 46 of a standard internal combustion or electric engine 47. An endless flexible transmission belt 48 is provided to transmit the torque of the engine to power take-off shaft 36. A clutch and brake mechanism is provided that includes an idler arm 49 that is pivotally mounted to frame 20 at one end and has at its other end an idler pulley 50. A brake actuator 51 is also pivotally mounted to frame 20 and resiliently connected to idler arm 49 through a spring 52.

Figure 6:
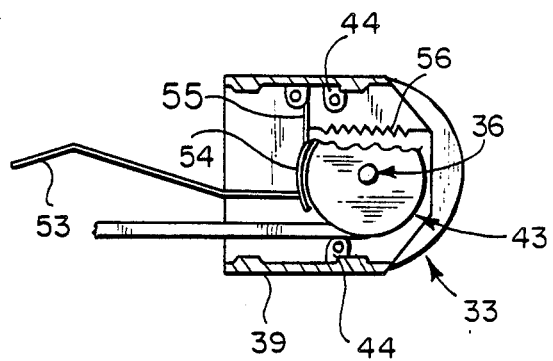
FIG. 6 is a partial section view of the front of the frame showing the brake assembly.

The operation of the brake and clutch mechanism can be better understood with reference to FIGS. 2 and 6. In FIG. 2, it can be seen that a brake arm 53 is connected to brake actuator 51. In FIG. 6 it can be seen that brake arm 53 is connected to a brake pad 54. Offset with respect to the brake pad is a brake pad arm 55 which is pivotally mounted to frame 20. This arm is spring biased toward the position shown in FIG. 6 by a spring 56.

When it is desired to engage the rotational movement of the cutting head, a bail 57 is pulled in to pivot brake actuator 51 through a brake cable 58. By this action, brake pad 54 is disengaged from the pulley groove and idler arm 49 is pivoted toward brake actuator 51 so that idler pulley 50 engages and tensions belt 48. The tension applied to belt 48 is then sufficient to rotate pulley 43 in the conventional manner. A suitable brake adjustment device 59 is provided on handle 60.

In FIG. 5, a bottom perspective view of the apparatus, with the engine omitted is shown. The frame of the apparatus is open at the bottom, and enclosed by a top wall 61 and side walls 62 and 63. A slot 64 is provided in each of the side walls, each slot receiving one end portion of the axle.

Figure 3:
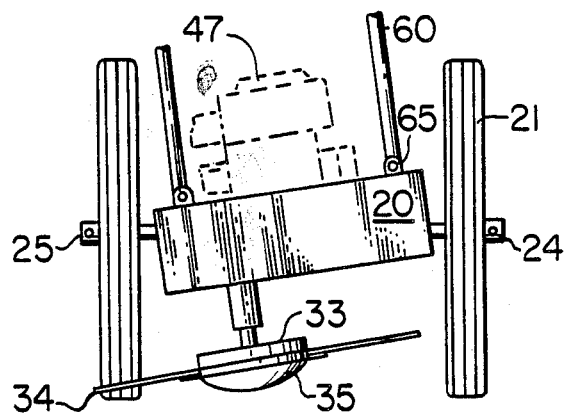
FIG. 3 is a front view of the apparatus showing the relationship of the cutting head to the wheels in a trimming position.

As seen in FIG. 4, the slot includes a longitudinal axis X. This longitudinal axis is generally perpendicular to the axis of rotation $A_2$ about which axle 23 pivots. Axis $A_2$ intersects the top wall at a leading acute angle and intersects the ground surface at a trailing acute angle which is preferably 65 degrees. The compliment of this angle, 25 degrees, defines the preferred acute trailing angle of the longitudinal axis X and top wall 61. By the relationship of the longitudinal axis of the slot and the axis of rotation of the axle, the frame acts to turn the axle about the axis of rotation in response to a torque applied to frame 20 about the frame's longitudinal axis L. The resultant motion, in terms of positioning the cutting head is to shift the cutting head to a position closer to one or the other of the wheels and to tilt the plane of cutting of the cutting head. In FIG. 3, a front view of the machine is shown in which the frame 20 has been tilted and the cutting head 33 has been shifted.

The shifting of the cutting head is desired since the nylon cord or blade is able to extend past the path of travel of the wheels. The tilting of the frame is also a desired objective, since the cutting will be lower to the ground. In the position as shown in FIG. 3, it is possible to trim along the edge of or under a building or fence while traveling parallel with that structure. It is also desirable to have the cutting plane tilt so that it is not parallel with the ground for the situation in which a cutting blade is used instead of a flexible cutting element. In this situation the angle of cut is advantageous since this prevents binding of the blade. The angle of intersection between the axis of rotation A2 and the top wall or ground can be changed with the result that the tilting of the frame with respect to the wheels will be decreased or increased accordingly. The ends of slots 64 determine the extent to which the frame will swing from side to side. Increasing the length of the slots increases the distance that the cutting head will shift laterally. The extent to which the cutting head is shifted in FIG. 2, both in solid lines and in dashed lines, is intended to be illustrative of the positions which can be achieved by the frame and axle construction and not limitations of the extent to which the cutting head can swing left or right.

As a result of this invention, one can position the cutting plane of the cutting head parallel to the ground and mow a lawn as one would with a standard lawn mower. In addition, by tilting the handle, the cutting head can be repositioned with respect to the wheels and vegetation to very close to the ground without scalping. As can be seen in FIG. 1 bumper 35 is provided with rounded edges so that tilting of the cutting head does not dig the cutting head into the ground.

To provide the tilting of the frame, a handle 60 is mounted to frame 20 through handle clamp 65 positioned on either side of the axis of rotation A2. This allows an operator to easily tilt the frame from the mowing position to the plurality of trimming positions.

In use, it is intended that the weight of the engine and the frame be balanced over the wheels so that it is easy for the operator to maneuver the forward end of the frame, where cutting head 33 is located. It is advantageous, therefore, to provide axle 23 with forwardly extended portions 66 so that the wheels are shifted more toward the front of the frame. Additionally, for the operator's safety a mud flap 67 is provided to prevent debris from being scattered back toward the operator. Mud flap 67 is attached to mud flap brackets 68, which are bolted to frame 20.

Figure 7:
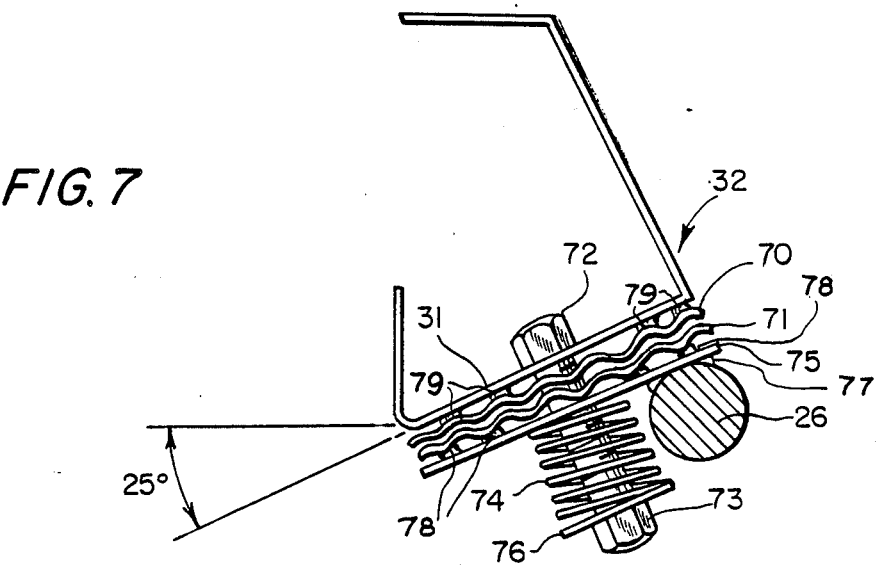
FIG. 7 is a partial side view of the apparatus with the engine omitted including a broken out sectional view showing an axle mount constructed according to a second embodiment.

In a second embodiment of the invention, a detent is provided between axle 23 and frame 32. As in FIG. 7, axle mid-portion is fixed, as by weld 77 to a flat washer 75. Washer 75 is in turn fixed as be welds 78 to a corrugated washer 71 that is in facing engagement with a second corrugated washer 70 that is fixed, as by welds 79 to end plate 31 of axle supporting portion 32. The corrugated washers are urged together under the action of a spring 74, coaxially mounted on a bolt 72 and held in compression by a lock nut 73 and flat washer 76. Facing washers 70 and 71 tend to nest together when angularly aligned to thereby provide a relatively stable position of adjustment between the frame and axle. For each corrugation a different position is provided, and in order to change the apparatus from one position to another position, the force of the spring acting on the facing washers must be overcome. This spring force is overcome by supplying a sufficient torque to frame 20 about longitudinal axis L through the use of handle 60. The applied torque then causes relative rotation between corrugated washer 70, which is fixed to frame 20 through axle supporting portion 32, and corrugated washer 71, which is fixed to axle mid-portion 26 through flat washer 75. Therefore, as the handle is tilted the corrugations of washers 70 and 71 alternately nest and slide over one another to provide a series of incremented positions of adjustment between the frame and axle.

Obviously, many modifications and variations of the present invention are possible in light of the above teachings. Thus, it is to be understood that within the scope of the appended claims the invention may be practiced then as specifically described.

I claim:

1. A mowing and trimming apparatus, comprising:
   a frame having front and rear portions, and having a longitudinal axis extending between said front and rear portions;
   a rotating cutting head mounted for rotational movement on said frame at said front portion;
   means for rotating said cutting head about a first axis of rotation, said cutting head having a plane of cutting substantially perpendicular to said first axis;
   an axle;
   ground engaging wheels rotatably mounted at opposite ends of said axle;
   means for pivotally mounting said axle to said frame transversely to said longitudinal axis about a second axis of rotation;
   handle means connected to said frame for applying torque to said frame about said longitudinal axis; and
   means for pivoting said axle about said second axis of rotation to turn said wheels relative to said frame in response to a torque applied to said frame through said handle means about said longitudinal axis, and for moving said cutting head and its first axis of rotation from a mowing position wherein said cutting plane is positioned substantially parallel to the ground to a plurality of trimming positions wherein said cutting plane is positioned non-parallel to the ground.

2. The apparatus according to claim 1, further comprising:
   said frame having a top wall substantially parallel with said cutting plane; and
   means positioning said second axis of rotation such that said second axis of rotation intersects the plane that includes said top wall at an oblique angle.

3. The apparatus according to claim 1, further comprising means positioning said second axis of rotation such that when said apparatus is supported in an operable position on the surface of the ground, said second axis of rotation forms an acute trailing angle at the point of intersection with the surface of the ground.

4. The apparatus of claim 2, wherein said means for pivotally mounting said axle comprises a bolt projecting outwardly and downwardly from said frame in axial alignment with said second axis, a washer supported for rotation on said bolt, a nut threadedly received on said bolt, and said axle being fixed for rotation with said washer at the mid-portion of said axle.

5. The apparatus according to claim 2, wherein said means for pivotally mounting said axle includes detent means for applying a rotation resisting torque between said axle and said frame such that said apparatus is caused to remain in one of said mowing position and said plurality of trimming positions by the force of said resisting torque and such that said axle is able to pivot about said second axis of rotation when the torque applied to said frame through said handle means exceeds said resisting torque.

6. The apparatus according to claim 1, further including:
   said frame further comprising a top wall and oppositely facing side walls extending substantially perpendicularly toward said bottom from said top wall;
   said means for pivotally mounting said axle comprising slot means in said side walls for receiving the opposite end portions of said axle such that each end of said axle extends through said slot means, said slot means extending in a longitudinal direction from said bottom of said frame toward said top wall at an oblique angle relative to said top wall, and means for positioning said second axis of rotation substantially perpendicular to said longitudinal direction of said slot means.

7. The apparatus according to claim 5, further including:
   said frame further comprising a top wall and oppositely facing side walls extending substantially perpendicularly toward said bottom from said top wall;
   said means for pivotally mounting said axle comprising slot means in said side walls for receiving the opposite end portions of said axle such that each end of said axle extends through said slot means, said slot means extending in a longitudinal direction from said bottom of said frame toward said top wall at an oblique angle relative to said top wall; and
   said means for pivoting said axle including means for positioning said second axis of rotation substantially perpendicular to said longtudinal direction of said slot means such that when said apparatus is supported in an operable position on the surface of the ground, said second axis of rotation forms an acute trailing angle at the point of intersection with the surface of the ground.

8. The apparatus according to claim 6, wherein said axle mounting means comprises a bolt projecting outwardly and downwardly from said frame in axial alignment with said second axis, a washer supported for rotation on said bolt and a nut threadedly received on said bolt such that said axle is fixed for rotation with said washer at the mid-portion of said axle.

9. The apparatus according to claim 6, wherein said means for pivotally mounting said axle includes detent means for applying a rotation resisting torque between said axle and said frame such that said apparatus is caused to remain in one of said mowing position and said plurality of trimming positions by the force of said resisting torque and such that said axle is able to pivot about said second axis of rotation when the torque applied to said frame through said handle means exceeds said resisting torque.

10. The apparatus according to claim 6, wherein said slot means comprises an elongated slot extending in said longitudinal direction from adjacent said rear portion of said frame toward said front portion of said frame.

11. The apparatus according to claim 7, wherein said acute angle is approximately 65 degrees.

12. The apparatus according to claim 3, wherein said acute angle is approximately 65 degrees.

13. The apparatus according to claim 6, wherein the projection of said longitudinal direction of said slot means intersects said top wall at an acute trailing angle.

14. The apparatus according to claim 1, wherein said means for rotating said cutting head further includes motor means mounted on said frame and having a downwardly extending drive shaft;
   a power take-off shaft mounted on said frame and journalled for rotation with respect to said frame;
   a drive shaft pulley, a power take-off shaft pulley and an endless flexible transmission belt for transferring a driving torque from said drive shaft to said power take-off shaft; and
   said cutting head extending downwardly from said bottom and fixed to said power take-off shaft for fixed rotation therewith.

15. The apparatus according to claim 14, further including an idler pulley clutch means in driven connection with said belt for tensioning said belt and brake means including a friction brake pad biased toward said power take-off shaft pulley for selective engagement therewith; and
   means for interconnecting said idler pulley means and said brake means such that said brake means is selectively disengaged with said power take-off drive shaft pulley when said idler pulley means is engaged with said belt and tensioning said belt.

16. The apparatus according to claim 1, wherein said cutting head includes means for attaching flexible cutting elements to the periphery of said cutting head.

17. The apparatus according to claim 1, further comprising:
   said cutting head being mounted to said frame at said front portion;
   said cutting head plane of cutting being substantially parallel to said top wall;
   said means for pivotally mounting said axle being at said rear portion;
   said handle means being connected to said frame at said rear portion;
   said means for pivoting said axle also positioning said cutting head spaced equidistantly between said wheels at said mowing position, and at said trimming positions, positioning said cutting head shifted laterally toward one of said wheels in an arcuate path of travel so that it is closer to said one of said wheels than to the other of said wheels.

18. The apparatus according to claim 17, wherein said means for pivotally mounting said axle includes detent means for applying a rotation resisting torque between said axle and said frame such that said apparatus is caused to remain in one of said mowing position and said plurality of trimming positions by the force of said resisting torque and such that said axle is able to pivot about said second axis of rotation when the torque applied to said frame through said handle means exceeds said resisting torque.

19. The apparatus according to claim 17, further including:
   said frame further comprising oppositely facing side walls extending substantially perpendicularly toward the frame bottom from said top wall;

said means for pivotally mounting said axle comprising slot means in said side walls for receiving the opposite end portions of said axle such that each end of said axle extends through said slot means, said slot means extending in a longitudinal direction from said bottom of said frame toward said top wall at an oblique angle relative to said top wall; and said means for pivoting said axle including means for positioning said second axis of rotation substantially perpendicular to said longitudinal direction of said slot means.

20. The apparatus according to claim 19, wherein said means for pivotally mounting said axle includes detent means for applying a rotation resisting torque between said axle and said frame such that said apparatus is caused to remain in one of said mowing position and said plurality of trimming positions by the force of said resisting torque and such that said axle pivots about said second axis of rotation when the torque applied to said frame through said handle means exceeds said resisting torque.

21. The apparatus according to claim 19, wherein said slot means comprises an elongated slot extending in said longitudinal direction from adjacent said rear portion of said frame toward said front portion of said frame.

22. The apparatus according to claim 19, wherein the projection of said longitudinal direction of said slot intersects said top wall at an acute trailing angle.

23. The apparatus according to claim 22, wherein said acute trailing angle is approximately 25 degrees.

24. The apparatus according to claim 19, wherein said means for rotating said cutting head further includes motor means mounted on said frame and having a downwardly extending drive shaft;

a power take-off shaft mounted on said frame and journalled for rotation with respect to said frame;

a drive shaft pulley, a power take-off shaft pulley and an endless flexible transmission belt for transferring a driving torque from said drive shaft to said power take-off shaft; and said cutting head extending downwardly from said bottom and fixed to said power take-off shaft for fixed rotation therewith.

25. The apparatus according to claim 24, further including an idler pulley clutch means in driven connection with said belt for tensioning said belt and brake means including a friction brake pad biased toward said power take-off shaft pulley for selective engagement therewith; and means for interconnecting said idler pulley means and said brake means such that said brake means is selectively disengaged with said power take-off drive shaft pulley when said idler pulley means is engaged with said belt and tensioning said belt.

26. The apparatus according to claim 18, wherein said cutting head includes means attaching flexible cutting elements to the periphery of said cutting head.

* * * * *